July 29, 1969  P. DE HERTEL EASTCOTT  3,458,151
TENSION CONTROL SYSTEM
Filed Jan. 22, 1968  3 Sheets-Sheet 2

INVENTOR.
PETER deHERTEL EASTCOTT

BY R.A. Eckersley

Patent Agent

July 29, 1969 P. DE HERTEL EASTCOTT 3,458,151
TENSION CONTROL SYSTEM

Filed Jan. 22, 1968 3 Sheets-Sheet 3

INVENTOR.
PETER deHERTEL EASTCOTT

BY

Patent Agent

United States Patent Office 3,458,151
Patented July 29, 1969

3,458,151
TENSION CONTROL SYSTEM
Peter de Hertel Eastcott, Peterborough, Ontario, Canada, assignor to Canadian General Electric Company Limited, Toronto, Ontario, Canada, a corporation of Canada
Filed Jan. 22, 1968, Ser. No. 703,222
Claims priority, application Canada, Jan. 28, 1967, 981,503
Int. Cl. B65h 25/22
U.S. Cl. 242—75.44                     11 Claims

ABSTRACT OF THE DISCLOSURE

A closed loop system for regulating the tension in a moving web of paper compares an electric signal set to represent the tension wanted with an electric signal representing a measure of tension to obtain a tension control signal. The measured signal is obtained by drawing a loop in the web with constant suction and beaming light onto its outer curved surface at an angle that reflects light according to curvature onto an array of solar cells which generate an electric signal representing web tension. Another signal also representing tension is obtained from the solar cells and used to give a direct measure of tension in the web.

---

This invention relates to a system for controlling the tension in a web of a pliable material such as paper while the web is moving at a high speed.

In United States application for patent, Ser. No. 594,721, filed Nov. 16, 1966, now Patent No. 3,379,390 of Apr. 23, 1968, Eastcott, and assigned to the same assignee as this invention, there is described a vacuum device for drawing a shallow loop in a web of a pliable material such as paper by means of suction at a pressure a little below atmospheric pressure while the web is advanced at a high speed. With the pressure in the vacuum device held relatively constant, the depth or curvature of this loop varies with the tension applied to the web, and it is measured by means of light directed onto the loop at an angle that allows some of the light to be reflected onto one or more cells which have electrical characteristics altered by the intensity of the light; the quantity of light reflected varies with the curvature of the loop. The curvature, or depth of the loop is determined by the extent that the web deflects in forming the loop.

The object of this invention is to provide an improved system for controlling web tension, a system that is fast in response and accurate in control.

Figure 1:
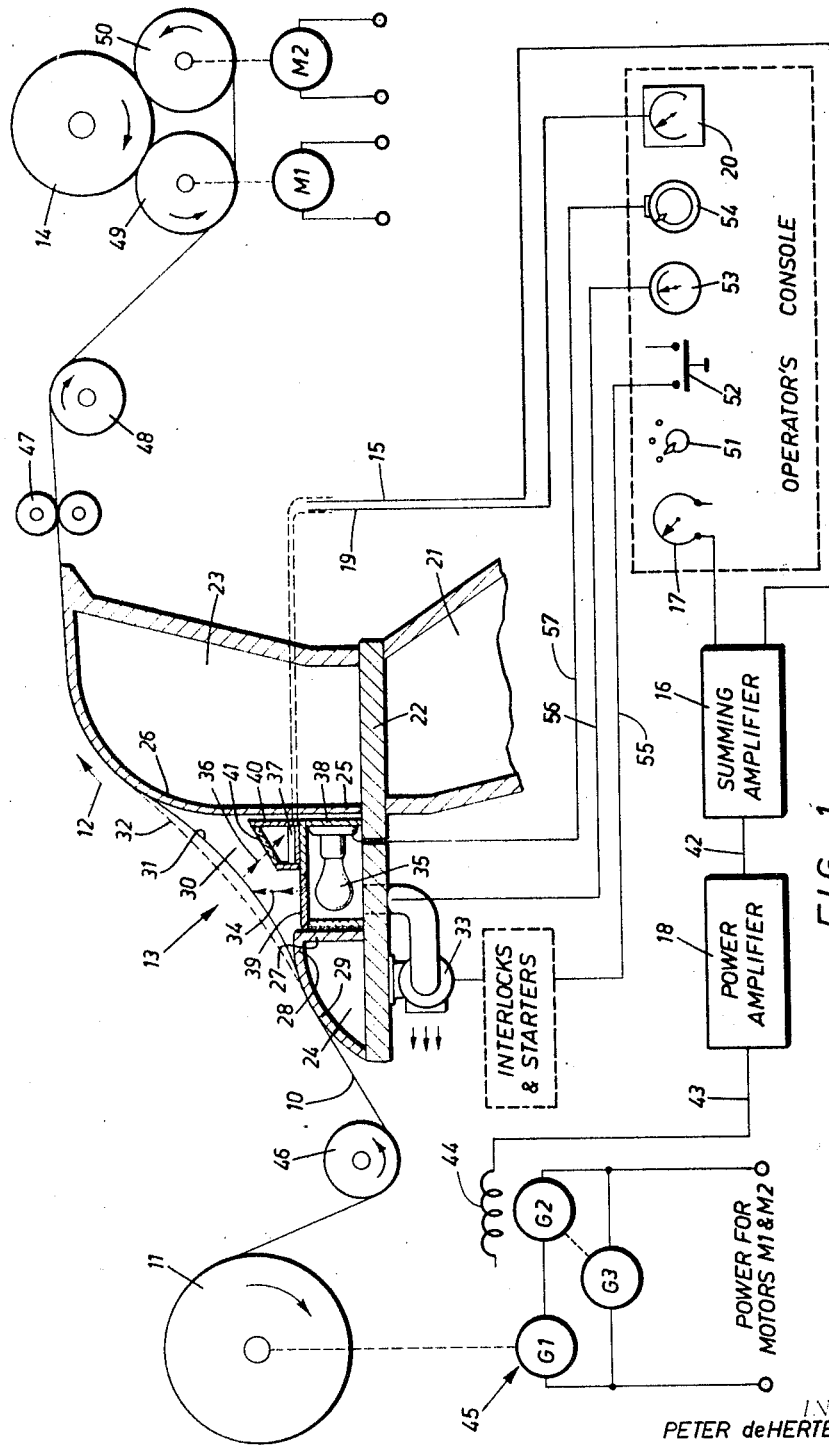
Figure 2:
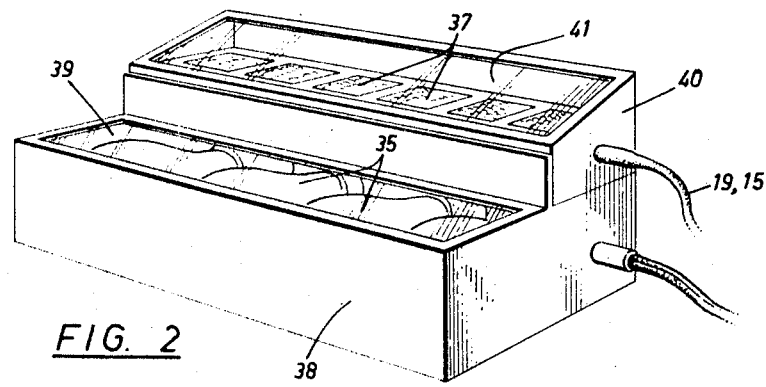
Figure 3:
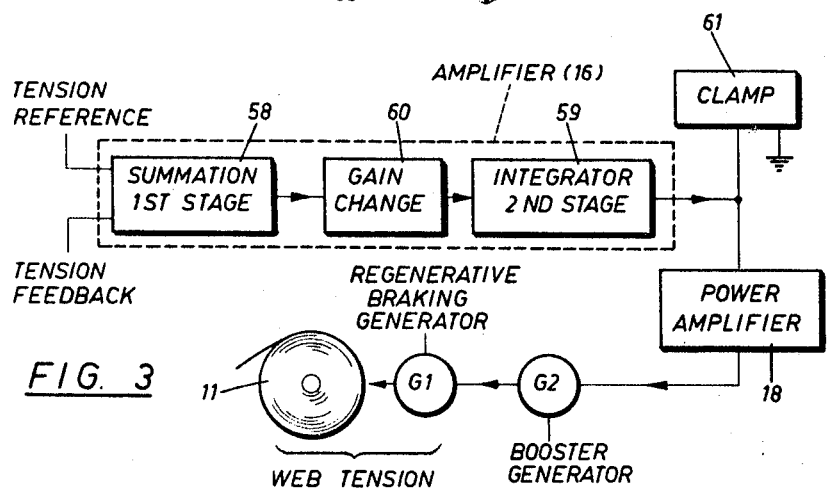
Figure 4:
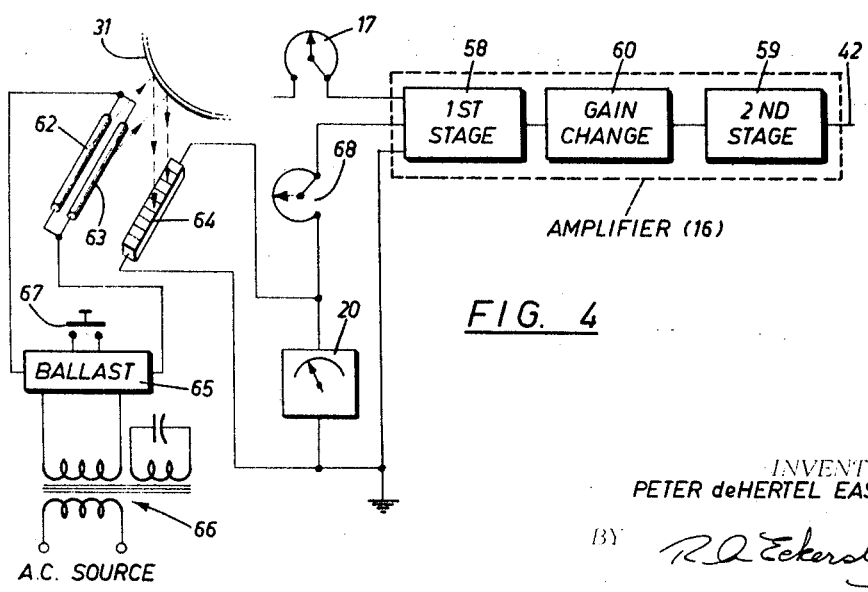
Figure 5:
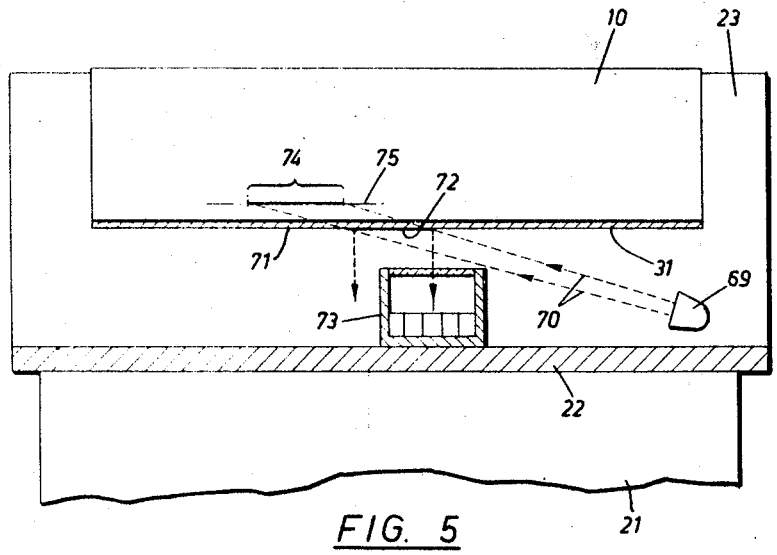

A closed loop, feed back regulating system for controlling web tension according to the invention employs a vacuum device of the kind described in the aforementioned application, a light source and light activated cells in combination with a number of other components. In the system the electric signal from the cells is used as a feedback signal in the closed loop regulator; it is summed algebraically with a reference signal representing web tension and which can be set for different values of tension. After summation, the combined signal is amplified and then used to control web tension by controlling the braking force applied to the web before it reaches the vacuum device. The system also provides for the application of electrical energy from the cells for direct measurement of web tension, and for the use of the measuring instrument for setting the level of illumination. A full understanding of the nature of the invention may be had from the following description taken in connection with the accompanying drawings in which:

FIGURE 1 is a diagram of a regulating system embodying the invention;
FIGURE 2 is a perspective view of an assembly of lamps and light activated cells suitable for use in the system of FIGURE 1;
FIGURE 3 is a diagram of the amplifiers;
FIGURE 4 is a diagram of another embodiment of the invention; and
FIGURE 5 is a view in cross section of the loop forming device illustrating another arrangement of the light source and light activated cells. This view is taken on a plane lengthwise and midway of the vacuum channel looking at the draw table.

A closed loop regulating system according to the invention will now be described with reference to FIGURE 1. In this figure there is shown a system for regulating the tension in a web 10 of a pliable material such as paper released from a roll 11 and advanced at high speed over a tension detecting assembly 13 in the direction 12 onto a roll 14. An electrical signal obtained in assembly 13 representing web tension is fed via line 15 to a summing amplifier 16 where it is summed algebraically with an electrical signal set by a rheostat 17. The signal set by the rheostat, in this instance manually by the operator, is a reference representing the particular web tension wanted, and the signal from the tension detecting assembly is a feedback signal which initiates any corrective action necessary to hold web tension within the tolerances of the value set by the rheostat. After summation and amplification at 16, the combined, or what will hereinafter be called the control signal, is further amplified in power amplifier 18 and thereafter applied to control the tension in the web as it advances from roll 11 to roll 14 in a way to be described later. Another electrical signal also representing web tension and obtained in assembly 13 is fed via line 19 to a meter 20 which is calibrated to read web tension directly in pounds per lineal inch of web width. This meter tells the operator what the measured value of web tension actually is at any particular moment, and it is also used by the operator for another purpose to be dealt with later.

Assembly 13 is a structure of the type described in the aforementioned patent application. It consists essentially of a pedestal 21 mounted on a foundation and supporting a flat, horizontal base plate 22 on which there is mounted a draw table 23 directly above the pedestal and a guard board 24 spaced to the left of the table. The table has a wall 25 rising vertically from the base plate and then curving to the right at 26; the guard board has a similar wall 27 spaced to the left of wall 25 and also rising vertically from the base plate but to a lower point 28 where it makes a right angle turn to the left and then curves downwardly at 29. An end wall located at each end of the draw table and guard board close the ends of the channel defined by walls 25, 27, and plate 22; neither of these end walls have been shown in FIGURE 1 in the interest of drawing clarity. The end walls may be simple plugs which rest in the channel at the edges of the loop and which are adjustable so the assembly can handle webs of different widths. They are low enough that the loop can pass freely over them without being obstructed by them, thereby allowing for variations in web width and lateral movement.

The end walls and the channel define a box-like structure disposed transverse to web 10 and having an open top side and a cavity 30.

The guard board and draw table are adapted to allow web 10 to be drawn freely over them as illustrated with a shallow loop such as that indicated at 31 or 32 drawn into cavity 30 by means of suction in the box at a pressure a little below atmospheric pressure. Vacuum may be applied to the box in any known way, as for example, by means of an exhaust fan at each end of the box having its intake in communication with cavity 30 near the end walls; one of these fans is illustrated at 33. The end walls are located near the edges of the web so as to minimize the amount of air drawn into the box at the ends of the loop. Curved surfaces 29 and 26 guide the web into and out of the loop and maintain it in the proper position between the end walls of the box.

For any given pressure of the suction in the box, the depth of the loop is an indication of the tension in the web; hence, by holding the pressure reasonably constant a signal representing the tension in the web can be obtained. Loop depth is defined as the amount that the web deflects from a plane surface tangential with respect to the curved surfaces 29 and 26. Fans 33 are a type which can be set to maintain a relatively constant negative air pressure in the box even though the quantity of air admitted to the box varies considerably. In the embodiment of the invention illustrated in FIGURE 1, a beam of light 34 from lamps 35 is directed onto the under surface of the loop at an acute angle thereto. Some of this light is reflected as indicated at 36 down onto a light responsive device 37 located below the reflecting surface; the amount of light reflected will depend on the depth of the loop, the deeper the loop the less light falling on device 37. Lamps 35 are enclosed in an opaque box 38 supported on base plate 22 and having a transparent window 39 in its top side for light 34 to pass through from the lamps to the under surface of the loop. Device 37 is enclosed in an opaque box 40 resting on top of box 38 beside its window 39 and having a transparent window 41 in its top side for admitting the light 36 reflected from the under surface of the top. In order to utilize a maximum of reflected light 36, the inside surfaces of enclosure 40 surrounding device 37 will be reflecting surfaces and window 41 will be a clear glass window sloping in the general direction of the loop. Device 37 may consist of a number of solar cells that generate electrical signal energy proportional to the lighting level in the enclosure. As this signal level is very low and readily affected by outside interference, shielded conductors are used at 15 and 19 to connect the cells to amplifier 16 and meter 20. The cells are connected in such a way that the signal energy is divided in a set proportion between the amplifier and meter.

The electrical signal from device 37, representing web tension as measured in tension detecting assembly 13, is summed algebraically with a reference signal of the same character from rheostat 17 in the summing amplifier 16, the reference signal representing the tension that the system is set for. In the system illustrated, the signal from device 37 is DC of varying amplitude and the reference signal is DC. A set proportion of the signal from device 37 is applied to meter 20 so that it continouslly provides a reading of web tension in pounds per lineal inch of web width. The signal energy for rheostat 17 comes from a direct current source, such as, for example, a rectifier connected to the output terminals of a constant voltage transformer with an adjustable output. After summation and amplification in amplifier 16, the combined signal is fed via line 42 to power amplifier 18 where it is amplified sufficiently to render it useful for web tension control purposes. In the system illustrated the output from amplifier 18 is fed via line 43 to an auxiliary field winding 44 of a booster generator G2 in the electrodynamic braking system 45 for the roll of paper 11 being unwound. Amplifiers 16 and 18 are both well known types.

As web 10 is withdrawn from roll 11, it passes under a roller 46, over tension detecting assembly 13, through a slitter 47, over a roller 48, under rollers 49 and 50 onto roll 14. Rollers 46 and 48 guide the web over the tension detecting assembly and through the slitter where the edges of the web are trimmed and the web is cut into a number of strips. Actually, number 14 represents a number of rolls of web, one for each strip. These rolls rest on and are driven by rollers 49 and 50, the rollers which advance the web and wind it up into roll 14. Rollers 49 and 50 are driven by motors M1 and M2 respectively.

In advancing the web, motors M1 and M2 do so against braking torque applied to roll 11 by means of the electrodynamic brake 45. By utilizing the signal output from amplifier 18 in the electrodynamic brake to control the braking torque, it is possible to hold web tension relatively constant within predetermined limits. The electrodynamic braking system illustrated at 45 is a well known system wherein a generator G1 driven by roll 11 is connected in parallel with a main generator G3 and the power output therefrom supplied to motors M1 and M2. In such a system, the energy produced by braking is used to power the driving motors, and not simply wasted. The torque which generator G1 applies to roll 11 is controlled by means of a booster generator G2 driven by the main generator G3 and having its armature connected in series with the armature of generator G1. Generator G2 passes current through generator G1 of a polarity which causes the latter to apply torque to roll 11 at all roll speeds, even at standstill. The magnitude of this torque depends on the current passed, and the current passed depends on the excitation of booster generator G2. Therefore, by applying the output from amplifier 18 to a suitably designed exciting winding in the booster generator, the braking torque applied to roll 11 is, in effect, placed under the control of the regulating system. In FIGURE 1, the output terminals of amplifier 18 are shown connected to an auxiliary field winding 44 in the booster generator through line 43.

In place of an electrodynamic braking system such as 45, it is possible to use a fluid regulator and brake of the types described in United States Patent No. 3,266,376, issued Aug. 16, 1966, Eastcott and Spibey, and assigned to the same assignee as this invention. In this system all the braking energy appears as heat and must be dissipated; it cannot be used in the drive as with the electrodynamic brake.

In addition to rheostat 17 and meter 20, the operator's console will have other control devices, of which those necessary for the operation of this particular regulating system are: a selector 51, pushbutton 52, a vacuum gauge 53, and a voltage adjustor 54. Selector 51 is used to select a mode of operation from three positions, namely, "regenerative," in which none of the controls in the closed loop feedback system operate, "indicate," in which the lamps and fans operate so that an indication of tension is given, and "automatic control," in which the fans and lamps operate and a corrective signal is applied in the system to keep web tension constant at a set value. Pushbutton 52 is used to start or stop the fan motors through a line 55 and a magnetic starter and interlocks. Gauge 53 is connected directly to the tension detecting assembly through line 56 gives a direct reading of the air pressure therein. Adjustor 54 is a means for adjusting the voltage of a constant voltage source, and it may be an adjustable constant voltage transformer or a regular constant voltage transformer in combination with an adjustable auto transformer. It is connected to lamps 35 through line 57 and used for setting the level of illumination from the lamps.

FIGURE 2 shows a lamp and solar cell arrangement which has been found to give good results. Four 6 volt, 25 watt incandescent lamps 35, connected in parallel, operate at approximately 4.5 volts for long lamp life. They are placed in a row inside enclosure 38. Eight solar cells 37 are placed in a row inside enclosure 40 directly above and to the right of the lamp filaments so as to fully expose windows 39 and 41 to the underside of the loop in the web. Every other one of the solar cells are connected in parallel and to meter 20 via line 19, and the remaining cells are connected in series and to amplifier 16 via line 15. The reason for the two different cell circuits is that this is a convenient way of matching the impedance of the circuit with the impedance of the load. As the lamps produce a significant amount of heat, enclosure 40 is sometimes insulated from enclosure 38 to avoid overheating the cells. The assembly of lamps and cells is supported on base plate 22 transversely of and in the middle of the web. In this particular scheme, webs of up to 180 inches in width were advanced at a regular production speed of 7200 f.p.m., the loop span was approximately 12 inches, and the vacuum was held at a pressure of about 1.0 inch of water.

During the normal course of unwinding roll 11, slitting the web at 47 and then rewinding the strips into rolls 14 with selector 51 set for automatic control, the web moves at high speed over tension detecting assembly 13 where a loop is drawn in the web of a curvature or depth depending on web tension. Since the vacuum acting on the web to form the loop is held constant, the depth of the loop is proportional to tension. The vacuum can be readily checked by the operator by looking at gauge 53. Hence the amount of light from the lamps reflected from the underside of the loop onto the solar cells will cause the cells to generate electrical signal energy of a magnitude representing web tension. The cells connected in parallel energize meter 20, causing it to give a reading visible to the operator of web tension in pounds per lineal inch of web width. The cells connected in series provide a signal for amplifier 16 representing the web tension measured. The amplifier compares this signal with a reference signal set by the operator on rheostat 17 to represent the tension he actually wants. After comparison and amplification at 16, the combined signal is amplified in amplifier 18 and then applied to field winding 44 of booster generator G2 for the control of the torque that generator G1 applies to roll 11.

As soon as roll 11 is completely unwound and its brakes fully applied, the vacuum in the tension detecting assembly shuts off automatically. Usually, the operator discontinues automatic control of tension a little before all the web is removed from roll 11 and completes the run through manual control, the changeover being made by turning selector 51 to the appropriate point. Starting a new roll 11 is also done under manual control, but before the vacuum is restored a reading of the lighting level in the tension detecting assembly is now possible while the web is drawn taut straight across the guard board and the draw table. With the web normally in a loop now a flat reflecting surface, the light activating the solar cells gives a reading on meter 20 which can be used to check the lighting level against a standard established for the tension measuring meter in foot candles per square foot. This reading may appear as a red mark on the face of the meter opposite which the pointer of the meter rests when the lighting level is as it should be. If the level is either too high or too low, the pointer will be off the mark, and the level can then be reset by turning the knob on voltage regulator 54 to raise or lower the lamp voltage as necessary. This calibrating means prevents changes in the colour and reflectance of the web from introducing errors in the tension measurements. When satisfied with the lighting level, the operator depresses button 52 to start the fans and thereby restore the vacuum in tension detecting assembly. He will now return the system to automatic control of tension and observe the vacuum gauge to ensure that the vacuum settles down at the required pressure. Once the system is back on automatic control, the operator will glance periodically at meter 20 and gauge 53 to satisfy himself that the tension and the vacuum are what they should be.

Amplifier 16 may have two stages 58, 59 interconnected through a gain change network 60 as illustrated in FIGURE 3. The reference and feedback signals are summed in the first stage, and the algebraic sum, or error, is fed to the second stage through the gain change network which reduces the gain of the system at web speeds below 1500 feet per minute. The second stage is connected as an integrator. This ensures that sudden large changes in error signal do not immediately cause large changes in the excitation of booster G2, but that a smooth corrective signal results of magnitude and character that restores web tension to the set value without abrupt changes which could cause the web to break or the ends on the rolls being wound up to become uneven. The output of the second stage is amplified in the power amplifier and then applied to a field winding of the booster generator for controlling the braking torque that the braking generator applies to the roll being unwound.

The source of light illustrated in FIGURES 1 and 2 uses a number of incandescent lamps. An advantage in using this type of lamp is that its light output is readily altered by simply raising or lower lamp voltage. A number of incandescent lamps placed in a row as shown in FIGURE 2 do not give as uniform a light output as do gaseous discharge lamps, for example, two or three fluorescent tubes placed side-by-side lengthwise of the lamp box, and they generate considerably more heat than do gaseuos discharge lamps of the same light output. The less heat that the lamps produce, the less danger there is of overheating the solar cells. However, the variations in light output possible with gaseous discharge lamps by changing voltage is rather limited, and in some applications insufficient for all the settings of web tension. Instead of changing the level of illumination for setting web tension, it is possible to operate the lamps on a constant voltage and adjust the signal from the solar cells to obtain the proper setting of web tension. This will be done as before by drawing the web taut across the suction box with no suction applied therein; but in this case, a signal proportioning device in the output circuit of the solar cells will be adjusted to bring the pointer of the tension indicating meter on the red mark on its scale. In this scheme, the lighting level is higher than it was in the first instance, and the signal level is reduced to correspond with the lighting level in the first instance.

FIGURE 4 illustrates the use of fluoreescent lamps operating on a constant voltage and a circuit for adjusting the output from the cells to the constant lighting level. In this figure, two tubular fluorescent lamps 62, 63 are located side-by-side transverse to the web in an enclosure such as 38 shown in FIGURE 2. The two lamps are connected in parallel and to the constant voltage side of a voltage stabilizing transformer 66 through a ballast 65. A push button 67 or some other known means may be used to start the lamps. The general arrangement of the lamps and the cells may be the same as that shown in FIGURE 2 except that the cells are now connected together in the single group illustrated at 64 rather than in two separate groups. Cell group 64 is connected through a rheostat 68 to a parallel circuit having two limbs, one of which contains meter 20 and the other amplifier 16. In the parallel circuit, the impedances of the two limbs are balanced such that the ratio remains the same iresepective of variations in amplitude of the signal. Hence the signal energy to the meter remains at a fixed proportion of the total as does the energy to the amplifier. As long as the circuit is properly calibrated the meter will give a continuous reading of actual tension in the web and the feedback signal will cause the closed loop regulating system to hold web tension at the reference value set on rheostat 17.

FIGURE 4 illustrates one of a number of circuits which can be used for proportional sharing of the signal energy between the meter and the amplifier. The particular circuit used in a regulating system will depend on the nature and magnitude of the signal and the circuit parameters. In some instances it may be advantageous to amplify the signal before it is proportioned between the meter and the amplifier.

In FIGURE 1, the light source emits its beam of light 34 in the general direction that the web travels. It is not necessary for the light beam to be in this direction; it can also be transverse to the web as shown in FIGURE 5, or in a direction between being transverse to and along the length of the web. The light source must, of course, be located so that its beam strike the web in a region where the loop changes depth with variation in web tension; preferably, the light strikes the web in a region where the changes in loop depth are near their maximum. Since changes in loop depth cause changes in the pattern of the light reflected, the light response device must be located where it can effectively detect this light pattern.

FIGURE 5 is a view in cross section of tension detecting assembly 13, omitting the assembly of lamps and light responsive device, but showing instead another arrangement of these components where the light beam is transverse to the web. FIGURE 5 is taken on a plane lengthwise of cavity 30 in the middle thereof looking at draw table 23; it shows the tension detecting assembly contacted in breadth over what it would be in practice, and as in FIGURE 1, the end stops have been omitted.

In this figure, a lamp 69 directs a collimated beam of light 70 onto the under surface 71 of loop 31 in about the middle of the web. This beam of light produces a bright spot 72 which moves back and forth across the web as the loop changes depth, i.e., as surface 71 moves up or down. For example, if the depth of the loop decreases so that surface 71 moves up, the bright spot moves to the left; if, on the other hand, the depth of the loop increases so that surface 71 moves down, the bright spot moves to the right. Hence, by locating a light responsive device 73 where it will receive light according to the position of the bright spot, loop depth can be detected. An electric signal from device 73 representing loop deptth is, of course, a signal representing the tension in the web. Because the surface of a web material such as paper scatters the light striking it, the bright spot will not be reflected in the sense that it would be from a mirror-like surface, but will be at its brightest directly below the spot. Device 73 will, therefore, be located below the loop where it receives a significant portion of the light reflected from the bright spot when the tension in the web is at its set value. This position is illustrated in FIGURE 5. In the position illustrated for device 73, an increase in web tension will decrease the light received by the device because surface 71 moves up, and a decrease in web tension will increase the light received by the device because surface 71 moves down. This movement of the bright is grossly exaggerated in the illustration where the spot is shown at 74 with the web surface in position 75, in which position the device receives little or no light from the spot.

Device 73 is an opaque box having a transparent window on top for admitting light to the box for activating a number of solar cells. Since the box should, if possible, exclude all light except that from the spot, its window will be placed as near as possible to the under surface of the loop, that is, the window will be just far enough from surface 71 that the box does not interfere with loop movement or with the collimated beam of light 70. The inside walls of the box may be reflecting surfaces for improved light gathering properties of the box.

As those skilled in the art are well aware, a modern paper making operation is far more complex than what has been illustrated and described. The illustrations and description are believed to be adequate for a full understanding of the invention by such a skilled person. There are, however, a number of control devices so intimately related to the practice of the invention that brief mention of them may be of interest. A voltage relay on the slitter has a set of contacts which pick-up at a web speed of about 1500 feet per minute and short circuits a resistor in the output of the summing amplifier to give a significant increase in system gain and speed response. At speeds below 1500 feet per minute, the lower gain and speed response is wanted. The fan starters are energized by a fan relay which is picked up when the operator presses button 52, provided the main contactor for the winder is already closed, that is, the winder is already in operation. The fans shut down automatically at the end of each run when the winder main contactor opens. When the fans are not running, the input and output of the integrating amplifier stage are clamped to zero by means of the clamp circuit illustrated at 61 in FIGURE 3. Also associated with the clamp circuit is an overvoltage relay which trips on overvoltage of the booster generator from a fault such as breakage of the web. On tripping of the overvoltage relay, the clamp circuit operates so that a false corrective signal is not fed to the power amplifier. When the web is broken, there is no feedback signal, but there still is a reference signal; thus the integrator would ramp to full output unless clamped. The circuit is also arranged so that the fans are turned off when the web breaks.

What I claim as new and desire to secure by Letters Patent of the United States is:

1. A closed loop feedback regulating system for holding a web of a pliable material such as paper under substantially constant tension during advancement of the web from a first to a second station comprising: driving means at said second station for advancing the web; braking means at said first station for applying a braking force to the web resisting advancement thereof and thereby placing the advancing web in tension; a vacuum device located between said stations on one side of the web for holding a shallow loop in the web transversely thereof, said loop being held by means of suction in said device at a relatively constant pressure a little below atmospheric pressure whereby the depth of the loop varies according to web tension; a light source for projecting a beam of light onto the outer curved surface of said loop at an acute angle thereto, said surface reflecting light of an amount varying with said depth and hence with said web tension; means activited by light reflected for generating an electrical signal varying in magnitude with the light reflected and therefore representing the web tension measured; means for setting a reference signal representing a constant value of web tension for the regulating system to hold; means for comparing the two signals and obtaining a control signal representing the difference between the measured and set values of web tension; means for amplifying the control signal; and means for applying the amplified control signal to said braking means for controlling said braking force so as to hold web tension within predetermined limits of the level set by the reference signal.

2. A closed loop feedback regulating system for holding a web of a pliable material such as paper under substantially constant tension during advancement of the web from a first to a second station comprising: driving means at said second station for advancing the web; braking means at said first station for applying a braking force to the web resisting advancement thereof and thereby placing the advancing web in tension; a vacuum device located between said stations on one side of the web for holding a shallow loop in the web transversely thereof, said loop being held by means of suction in said device at a relatively constant pressure a little below atmospheric pressure whereby the depth of the loop varies according to web tension; a light source for projecting a beam of light onto the outer curved surface of said loop at an acute angle thereto, said surface reflecting light of an amount varying with said depth and hence with said web tension; means activated by light reflected for generating electric signal energy varying in magnitude with the light reflected; means for proportioning said energy into a first and a second signal both representing the web tension measured; means for setting a reference signal representing a constant value of web tension for the regulating system to hold; means for comparing said first signal with said reference signal to obtain a control signal representing the difference between the measured and set values of web tension; means for amplifying the control signal; means for applying the amplified control signal to said braking means for controlling said braking force so as to hold web tension within predetermined limits of the level set by the reference signal; and means for measuring said second signal to obtain readings of web tension.

3. The system defined in claim 2 wherein said light activated means consists of a number of solar cells connected together in two groups which share the light collected such that both generate an electric signal representing web tension, one of said groups supplying said first signal to said comparing means and the other group supplying said second signal to a meter calibrated to read web tension.

4. The system defined in claim 3 wherein said light source consists of a number of incandescent lamps connected to a power supply through a voltage adjustor whereby the level of illumination can be adjusted.

5. The system defined in claim 2 wherein said light activated means consists of a number of solar cells connected together in a single group which generate an electric signal representing web tension, and wherein the output circuit from said group of cells contains said signal comparing means, said tension measuring means, and means for proportioning the output signal from the cell group between the comparing and measuring means such that both signals represent web tension.

6. The system defined in claim 5 wherein said light source consists of one or more gaseous discharge lamps operating on a constant voltage.

7. The system defined in claim 2 wherein said measuring means is an electric meter calibrated to give direct readings of web tension being measured.

8. The system defined in claim 2 wherein said comparing means is an operational amplifier having an initial stage for summing the two signals algebraically followed by a gain change network and an integrating stage, and wherein said amplifying means is a high gain power amplifier.

9. In a closed loop regulating system for controlling web tension, a suction box held at a constant air pressure a little below atmospheric pressure for drawing a loop in the web varying in depth with said tension; a light source for projecting a beam of light onto the outer curved surface of said loop at an acute angle thereto, said surface reflecting light according to loop depth; means activated by light reflected for generating electric signal energy varying in magnitude with the light reflected and therefore web tension; means for proportioning said energy into a first and a second signal both representing web tension; means for comparing said first signal with a reference signal representing a set web tension and obtaining a control signal used in the system for holding web tension at the set value; and means for measuring said second signal to obtain readings of web tension: the method of correlating said signal energy and lighting level with a calibrated point on said measuring means comprising (1) drawing the web taut straight across said suction box so as to present a plane reflecting surface to said light beam and (2) adjusting one or both of the following to a reading of said measuring means on said calibrated point: (a) the level of the lighting; (b) the level of the signal energy.

10. The method of claim 9 wherein said correlation is carried out by changing the lighting level only by changing the voltage on the lamps of the light source.

11. The method of claim 9 wherein said correlation is carried out by keeping the lighting level constant through a constant voltage on the lamps of the light source and adjusting the signal energy level while maintaining said signal proportioning between the comparing and measuring means.

References Cited

UNITED STATES PATENTS

| | | | |
|---|---|---|---|
| 2,900,143 | 8/1959 | Bandy et al. | 242—75.44 |
| 3,379,390 | 4/1968 | Eastcott | 242—75.44 |

NATHAN L. MINTZ, Primary Examiner